(No Model.) 2 Sheets—Sheet 1.
J. G. THOMAS.
HORSE RAKE.
No. 243,995. Patented July 5, 1881.
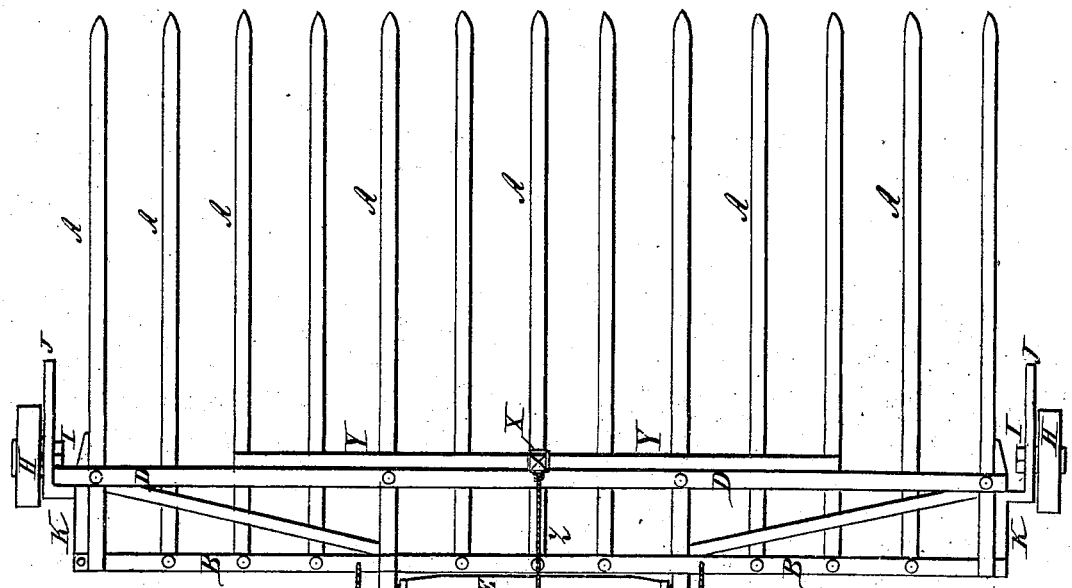
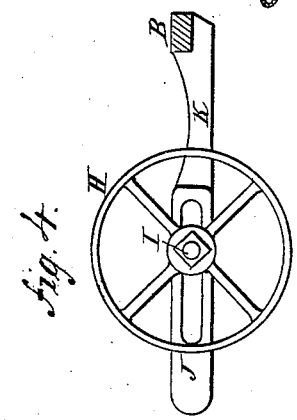
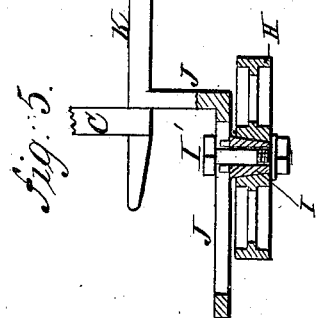
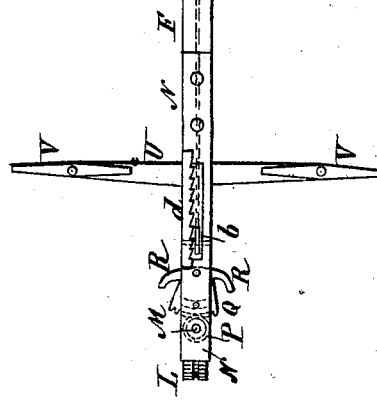
WITNESSES:
A. Schehl.
C. Sedgwick
INVENTOR:
J. G. Thomas
BY Munn & Co
ATTORNEYS.
N. PETERS. Photo-Lithographer. Washington, D. C.

(No Model.) 2 Sheets—Sheet 2.

J. G. THOMAS.
HORSE RAKE.

No. 243,995. Patented July 5, 1881.

WITNESSES:
A. Schehl
C. Sedgwick

INVENTOR:
J. G. Thomas
BY
ATTORNEYS.

UNITED STATES PATENT OFFICE.

JOHN G. THOMAS, OF JUDSON, MISSOURI.

HORSE-RAKE.

SPECIFICATION forming part of Letters Patent No. 243,995, dated July 5, 1881.

Application filed April 11, 1881. (No model.)

*To all whom it may concern:*

Be it known that I, JOHN G. THOMAS, of Judson, in the county of Sullivan and State of Missouri, have invented a new Improvement in Hay-Rakes, of which the following is a full, clear, and exact description.

Figure 2:
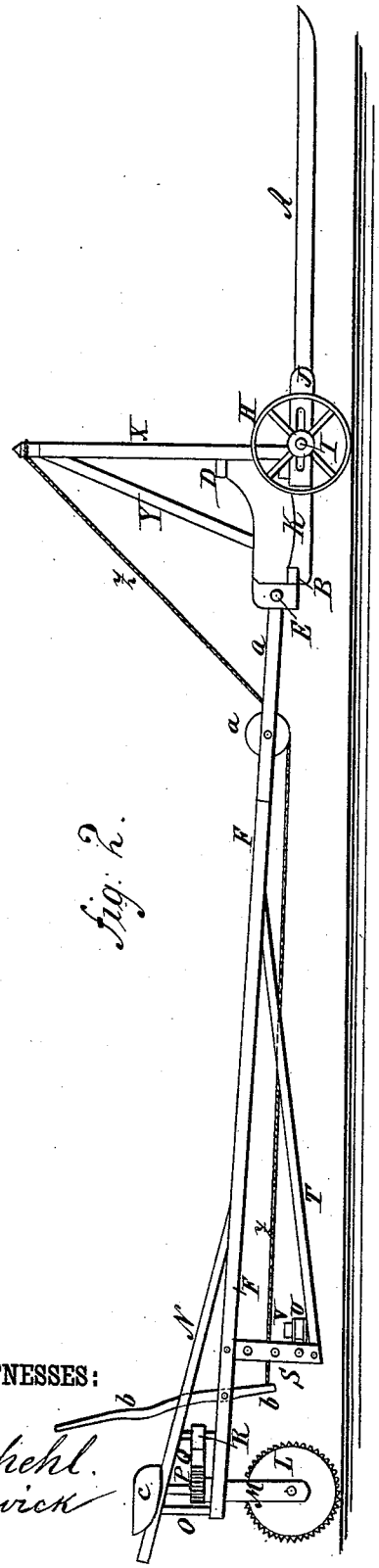
Figure 3:
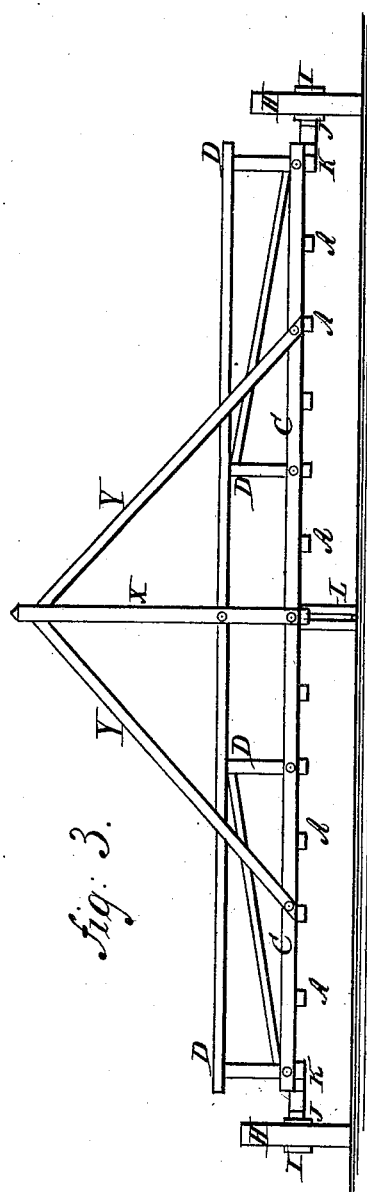

Figure 1, Sheet 1, is a plan view of my improvement. Fig. 2, Sheet 2, is a side elevation of the same. Fig. 3, Sheet 2, is a front elevation of the same. Fig. 4, Sheet 1, is a side elevation of one of the wheels and its bearing. Fig. 5, Sheet 1, is a plan view of one of the wheels and its bearing.

The object of this invention is to facilitate the gathering of hay and other substances for stacking and other purposes.

A are the rake-teeth, which can be made of wood or of steel wire or other suitable material. The teeth A are eight feet (more or less) in length, and are attached at their rear ends to a cross-bar, B, thirteen feet (more or less) in length.

To the teeth A, at a little distance from their rear ends, is attached a second cross-bar, C, to keep the rake-teeth in proper relative position.

To the bar C is attached a low upright frame, D, to serve as a guard, head, or stop to prevent the collected hay from slipping off the rear ends of the rake-teeth.

To supports attached to the rear side of the cross-bar B are pivoted the ends of a roller, E, to the center of which is attached the forward end of the tongue F, the connection being strengthened by braces or hounds G.

The forward part of the rake is supported upon two wheels, H, which revolve upon thimbles I, placed upon the bolt I'. The inner ends of the thimbles I, or lugs formed upon the said ends, enter slots in the horizontal arms J, and are thus held from turning. The parts of the bolts I' that enter the slots of the arm J are made square to hold the said bolts from turning. The wheels H are kept in place upon the thimbles I, and the said thimbles I are kept in place upon the arms J and bolts I' by nuts screwed upon the forward ends of the said bolts. The rear end of the arms J are bent inward at right angles, and are formed solid with bars K, parallel with the arms J. The bars K are securely bolted to the ends of the bars B C. The bearings or frames J K thus securely connect the wheels H with the rake-head and allow the said wheels to be adjusted to properly balance the said rake-head.

The rear end of the rake is supported by a single wheel, L, which is pivoted to the standard M. The standard M is swiveled to the rear ends of the tongue F and the inclined bar N. The forward end of the inclined bar N is attached to the tongue F, and its rear end is supported by an upright, O, attached to it and to the rear end of the said tongue F.

To the swiveled standard M, between the tongue F and the bar N, is attached a gear-wheel, P, into the cogs of which mesh the cogs of a segmental gear-wheel, Q, pivoted to and between the tongue F and inclined bar N.

To the segmental gear-wheel Q are attached, or upon it are formed, arms R, projecting upon the opposite sides of the tongue F, to serve as stirrups to receive the driver's feet, and as foot-levers to allow the driver to turn the wheel L with his feet, and thus guide the machine.

To the tongue F, a little in front of the wheel L, are attached the upper ends of two hangers, S, to the lower ends of which is attached the rear end of the inclined brace-bar T. The forward end of the bar T is attached to the tongue F. In the hangers S are formed a number of holes to receive the bolt of the clevis, block, or other coupling to which the double-tree U is pivoted, so that the point of draft attachment can be raised and lowered as may be required.

To the ends of the double-tree U are pivoted single-trees V, in the ordinary manner.

To the cross-bar B, directly in front of the single-trees V, are attached ropes or chains W, to be connected with the breast-straps of the harness, so that the rake can be drawn out from beneath the collected hay by backing the horses.

To the centers of the cross-bar C and the frame D is attached a standard, X, which is strengthened in position by braces Y, attached to it at their upper ends, and attached at their lower ends to the cross-bars C B.

To the upper end of the standard X is attached the forward end of a cord or chain, Z, which passes around a guide-pulley, *a*, pivoted in a slot in the tongue F. The cord Z passes through a slot in the inclined brace T, and its rear end is attached to the lower end of the lever $b$. The lever $b$ passes through slots in the tongue F and inclined bar N, and is pivoted to the said tongue F. The upper end of the lever $b$ projects into such a position that it can be conveniently reached and operated by the driver from his seat $c$, to raise and lower the forward end of the teeth A as may be required. The lever $b$ is held in any position into which it may be adjusted by a toothed bar, $d$, attached to the inclined bar N, and with the teeth of which the said lever $b$ engages. The driver's seat $c$ is attached to the rear end of the inclined bar N.

Having thus described my invention, what I claim as new, and desire to secure by Letters Patent, is—

In a hay-rake, the combination, with the rake-head A B C D and the wheels H, of the bars K, having slotted arms J, and the adjustable axles I, substantially as herein shown and described, whereby the wheels can be adjusted forward or back to balance the rake-head, as set forth.

JOHN G. THOMAS.

Witnesses:
  D. H. CRUMPACKER,
  CALEB PAYNE,
  S. M. GRIGSBY,
  S. F. LYNN,
  H. T. McCLANAHAN,
  JAMES MORRIS.